United States Patent [19]

Lee et al.

[11] Patent Number: 5,812,425
[45] Date of Patent: Sep. 22, 1998

[54] METHOD FOR CHANGING OPERATION OF CIRCUITRY IN A CPU BASED ON A STATISTIC OF PERFORMANCE OF THE CPU

[75] Inventors: Sherman Lee, Rancho Palos Verdes, Calif.; David G. Kyle, Austin, Tex.

[73] Assignee: Advanced Micro Devices, Inc., Sunnyvale, Calif.

[21] Appl. No.: 710,294

[22] Filed: Sep. 16, 1996

[51] Int. Cl.[6] ............................. G06F 11/26; G06F 11/00
[52] U.S. Cl. .................................... 364/551.01; 395/183.1
[58] Field of Search .................................. 395/561, 567, 395/570, 183.1; 364/551.01

[56] References Cited

U.S. PATENT DOCUMENTS

| 4,792,955 | 12/1988 | Johnson et al. | 371/68 |
| 5,437,039 | 7/1995 | Yuen | 395/725 |
| 5,465,258 | 11/1995 | Adams | 395/704 |
| 5,710,724 | 1/1998 | Burrows | 364/551.01 |

OTHER PUBLICATIONS

"PowerPC 602 Aims for Consumer Products", Linley Gwennap, Microprocessor Report, Feb. 16, 1995, pp. 16–18.
"Intel's P6 Uses Decoupled Superscalar Design", Linley Gwennap, Microprocessor Report, Feb. 16, 1995, pp. 9–15.
"New Algorithm Improves Branch Prediction", Linley Gwennap, Microprocessor Report, Mar. 27, 1995, pp. 17–21.
"The Dr. Watson Diagnostic Tool", Technical Articles: Windows: Development Environment—Microsoft Development Library, pp. 1–7, May 1994.
"An Annotated Dr. Watson Log File", KB:Windows SDK KBase—Microsoft Development Library, PSS ID Number: Q81142, Jun. 1995, pp. 1–4.
"WW0440: The DrWatson and MSD Diagnostics", KB:Windows 3.x KBase—Microsoft Development Library, PSS ID Number: Q75020, Jul. 1995, pp. 1–7.

Wolfe, Alexander, "Intel equips its P6 with test and debug features", Electronic Engineering Times Oct. 16, 1995 N870 p1(2), Computer Select, Dec. 1995, pp. 1–3.
Graham, Andrew J., "Profiting from standards", Electronic Engineering Times Oct. 23, 1995 N871 p24(2), Computer Select, Dec. 1995, pp. 1–3.
Daniel, Wayne, "Test bus takes a ride on popular PCI", Electronic Engineering Times Oct. 16, 1995 n870 p55(1), Computer Select, Dec. 1995, pp. 1–3.
Hlavaty, Joseph, "Exception Handlers and Windows Applications", Dr. Dobb's Journal on CD–ROM, Sep. 1994, pp. 1–15.
Pietrek, Matt, "Postmortem Debugging", Dr. Dobb's Journal on CD–ROM, Sep. 1992, pp. 1–12.
"Nx686 Goes Toe–to–Toe With Pentium Pro", Linley Gwennap, Microprocessor Report, Oct. 23, 1995, pp. 6–10.
"Hal Reveals Multichip SPARC Processor", Linley Gwennap, Microprocessor Report, Mar. 6, 1995, pp. 6–11.

(List continued on next page.)

*Primary Examiner*—Krisna Lim
*Attorney, Agent, or Firm*—Skjervan, Morrill, MacPherson, Franklin & Friel LLP; Omkar K. Suryadevara

[57] ABSTRACT

A computer process transforms a "general purpose" central processing unit (hereinafter "CPU") into one of a number of possible "special purpose" CPUs by changing operation of circuitry in the CPU. Changing operation of CPU circuitry as described herein "fine tunes" behavior of the CPU, e.g. provides resources and environment most suitable for execution of a specific application program, or even a portion of an application program. The computer process performs the steps of: checking whether the CPU has a tunable unit, waiting for a triggering event indicating a need for fine tuning, reading one or more statistics on the performance of the CPU, comparing the read statistics with corresponding predetermined statistics, determining a multi-valued parameter signal depending on the comparison, driving the determined parameter signal to the tunable unit and changing operation of circuitry in the tunable unit depending on the received parameter signal, thereby to fine tune operation of the tunable unit and the CPU.

10 Claims, 6 Drawing Sheets

OTHER PUBLICATIONS

"Computer Organization and Design", John L. Hennessy, etc., Morgan Kaufmann Publishers, Chapter, 7, pp. 502–504.

"Intel Equips Its P6 With Test and Debug Features", Alexander Wolfe, Electronic Engineering Times, Oct. 16, 1995, pp. 1, 106.

"P6 Stirs Up Software Issues", Alexander Wolfe, Electronic Engineering Times, Oct. 30, 1995, p. 22.

"Intel's Potent P6 Premiers", Alexander Wolfe, Electronic Engineering Times, Oct. 30, 1995, pp. 1, 22, 24.

Pentium™ Processor User's Manual, vol. 1, Chapter 3, Intel, 1993, pp. 3–1 to 3–25.

The Complete X86, John Wharton, vol. II, Chapter 20, 1994, pp. 639–679.

METHOD FOR CHANGING OPERATION OF CIRCUITRY IN A CPU BASED ON A STATISTIC OF PERFORMANCE OF THE CPU

CROSS-REFERENCE TO RELATED APPLICATIONS

This application is related to and incorporates by reference herein in their entirety the following commonly owned, concurrently filed, copending U.S. Patent Applications:

1. "A Port For Fine Tuning A Central Processing Unit" by Sherman Lee and David G. Kyle, Ser. No. 08/710,337 filed Sept. 16, 1996; and 2. "A Method For Identifying And Correcting Errors In A Central Processing Unit" by Sherman Lee and David G. Kyle, Ser. No. 08/710,336 filed Sept. 16. 1996.

FIELD OF THE INVENTION

This invention relates to a method for monitoring and controlling the performance of a central processing unit (CPU). In particular, this invention relates to a method for evaluating performance statistics of the CPU and changing operation of circuitry in the CPU depending on the evaluation.

BACKGROUND OF THE INVENTION

A conventional microprocessor, such as INTEL'S P6, is a "general purpose" microprocessor that has a predetermined configuration. The predetermined configuration is a result of design trade-offs between running certain types of application programs faster than other types. The application programs are typically diverse, such as spread sheet applications, word processing applications and video game applications.

Such application programs may be drawn from commercial benchmarks of the type described in "The Complete x86," Chapter 20, MicroDesign Resources, 1994 that is incorporated by reference herein in its entirety. Designers of central processing units (CPUs) may use an 80–20 rule in optimizing the CPU for running 20% of the most common application programs (e.g. programs known to be used 80% of the time). Thus the rest of the application programs run less than optimally on such "general purpose" microprocessors.

For example, an article "P6 stirs up software issues", by Alexander Wolfe, Electronic Engineering Times, Oct. 30, 1995, page 22 states: "a 133-MHz P6 running Windows 3.1 runs 10 to 20% slower than a Pentium". The article also cites an INTEL warning that "programs that intermix . . . use of 8-, 16- and 32-bit registers can result in partial pipeline stalls, which slow performance." According to Wolfe, "Intel is providing special optimizing compilers and a software performance aide called the Visualized Tuning Tool (V Tune) ." However, such tools fail to improve the performance of application programs (such as 16m-bit code) that predate (e.g. were sold before) the P6. Therefore, to use INTEL's P6 a user must discard such preexisting software and buy a whole new generation of 32-bit software at a considerable expense.

Conventional microprocessors, such as INTEL's PENTIUM™ have one or more on-chip caches with "modes", such as a "cache disabled" (CD) mode and a "not write thru" (NW) mode. The PENTIUM's modes are described in "Pentium™ Processor User's Manual" (see in particular Volume 1, Chapter 3) available from Intel Corporation, Literature Sales, PO Box 7641, Mt. Prospect, Ill. 60056-7641 that is incorporated by reference herein in its entirety. For example, setting a bit CD to 0 in register CR0 of the PENTIUM™, results in disabling a cache in the PENTIUM™ (see Table 3-2 of the above-incorporated manual). Moreover, Intel states that "the cache must be flushed after being disabled . . . "

SUMMARY

A computer process in accordance with the invention transforms a "general purpose" central processing unit (hereinafter "CPU") into one of a number of possible "special purpose" CPUs by changing operation of circuitry in the CPU. The CPU has one or more functional units (hereinafter "tunable units") that operate differently depending on one or more parameters. The functional units parameters (also called "multi-valued parameters") can have one of a number (e.g. 4) of different values selectable from a predetermined range (e.g. programming model sizes of 8 bit, 16 bit, 32 bit and 64 bit). In one embodiment, the computer process changes one or more parameters of one or more functional units, thereby to change operation of circuitry internal to the functional units in response to the changed parameter.

Changing operation of CPU's internal circuitry as described herein "fine tunes" behavior of the CPU, e.g. provides resources and environment most suitable for execution of a specific application program, or even a portion of an application program. The multi-valued parameters of this invention allow the computer process to change the internal circuitry's behavior gradually unlike prior art operating systems that, for example, completely enable or completely disable the use of a microprocessor's on-chip cache.

In one embodiment, the computer process performs the steps of: checking whether the CPU has a tunable unit, waiting for a triggering event indicating a need for fine tuning, reading one or more statistics on the performance of the CPU, comparing the read statistics with corresponding predetermined statistics, determining a parameter signal depending on the comparison, driving the parameter signal to the tunable unit and changing operation of circuitry in the tunable unit depending on the parameter signal, thereby to fine tune operation of the tunable unit.

In addition to the above-described steps, a computer process may include other steps such as entering a critical section (e.g. by disabling interrupts and serializing execution) prior to the "circuitry operation changing" step and leaving the critical section after the "circuitry operation changing" step. In one specific embodiment, all the above-described steps are executed in the CPU, and the computer process is included as a component in the CPU, for example in hardware circuitry, or in microcode, or in Basic Input Output System (BIOS) instructions, or in operating system instructions, or as a device driver. Thus the computer process of this invention is unlike a debugging process in a device external to the CPU, such as an in-circuit emulator.

In one embodiment, the step of entering the critical section includes switching to a memory that is otherwise inaccessible, so that the computer process operates transparent to the operating system and to an application program controlled by the operating system. Moreover, depending on the embodiment, the triggering event for the fine tuning process can occur at the start of execution of every application program, or can occur periodically (e.g. every 5 seconds). That is, the computer process can change circuitry operation in a tunable unit, and thereby change a CPU's profile periodically, even during the execution of an application program.

Therefore, the computer process can change operation of internal circuitry such that the CPU has a first profile capable of most efficiently executing a first application program (such as a video game application), and can again change operation of internal circuitry such that the CPU has a second profile capable of most efficiently executing a second application program (such as a spreadsheet application) and so on. Such fine tuning allows the CPU to execute even portions of an application program efficiently.

DETAILED DESCRIPTION

Figure 1A:
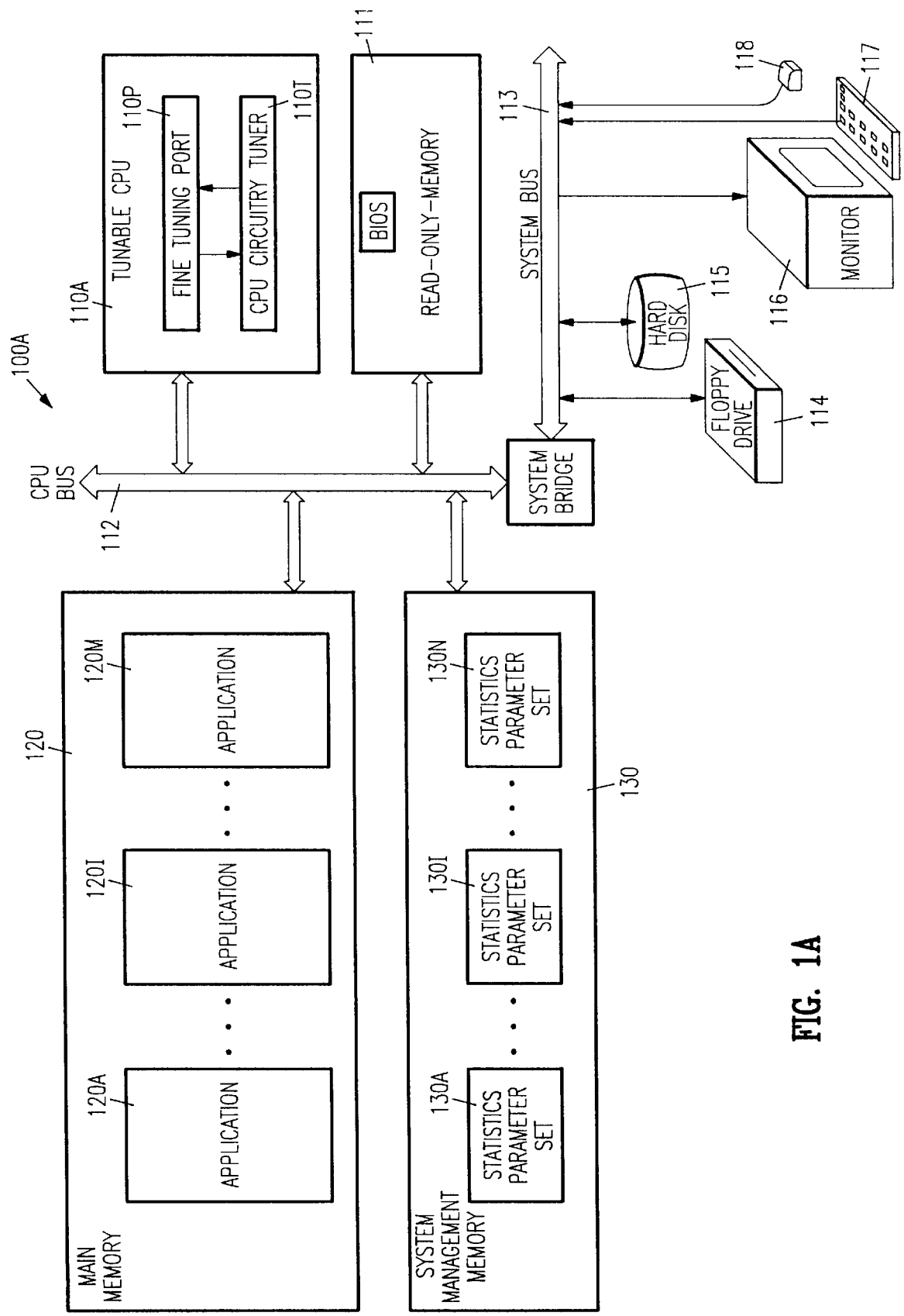
FIGS. 1A, 1B and 1C each illustrate a central processing unit (CPU) circuitry tuner in three different embodiments of a computer system.

In accordance with the invention, a central processing unit (hereinafter "CPU") has a number of functional units (hereinafter "tunable units"), and each tunable unit has one or more parameters that can be gradually changed, to thereby gradually change operation of circuitry in the tunable unit. Each parameter (also called "multi-valued parameter") can have one of a number (e.g. 1024) of different values selectable from a predetermined range (e.g. cache size in the range 0-1023 bytes).

A computer process in one embodiment of the invention waits for a triggering event (such as a periodic timer event indicating the need for fine tuning of the CPU), reads one or more statistics on performance of the CPU, compares the read statistics with a number of patterns (or a single pattern in one embodiment) of predetermined statistics to determine one or more parameter signals, and drives the parameter signals to one or more tunable units, thereby to change the circuitry operation in the CPU.

Examples of circuitry in a tunable unit and a device (also called "fine tuning port") for changing circuitry in the tunable unit are described in the U.S. patent application Ser. No. 08/710,337 entitled "A Port for Fine Tuning a Central Processing Unit" by Sherman Lee and David G. Kyle that is incorporated by reference above.

Although specific circuitry is described herein for a particular embodiment of the invention, other such embodiments will be obvious to a person skilled in the art of designing control systems for microprocessors in view of the disclosure. Accordingly, the embodiments described herein are merely illustrative and not limiting.

In one embodiment, a computer system 100A includes a tunable CPU 110A that has a fine tuning port 110P (as described above) and a CPU-circuitry tuner 110T. CPU-circuitry tuner 110T reads statistics from fine tuning port 110P and on matching the read statistics to one of a number of patterns of predetermined statistics (as described more completely below) drives a corresponding set of parameter signals to fine tuning port 110P.

In addition to tunable CPU 110A, computer system 100A includes a read only memory (ROM) 111 that is encoded with a basic input output system (BIOS) instructions for tunable CPU 110A. Read only memory 111 and tunable CPU 111A are coupled to each other by a CPU bus 112 that is also coupled via a system bridge (not labelled) to a system bus 113. System bus 113 in turn is coupled to a floppy drive 114, a hard disk 115, a monitor 116, a keyboard 117 and a mouse 118. CPU bus 112 is also coupled to a main memory 120 that is encoded with a number of applications, e.g. application 120A . . . 120I . . . 120M, where M is the number of applications.

Figure 4:
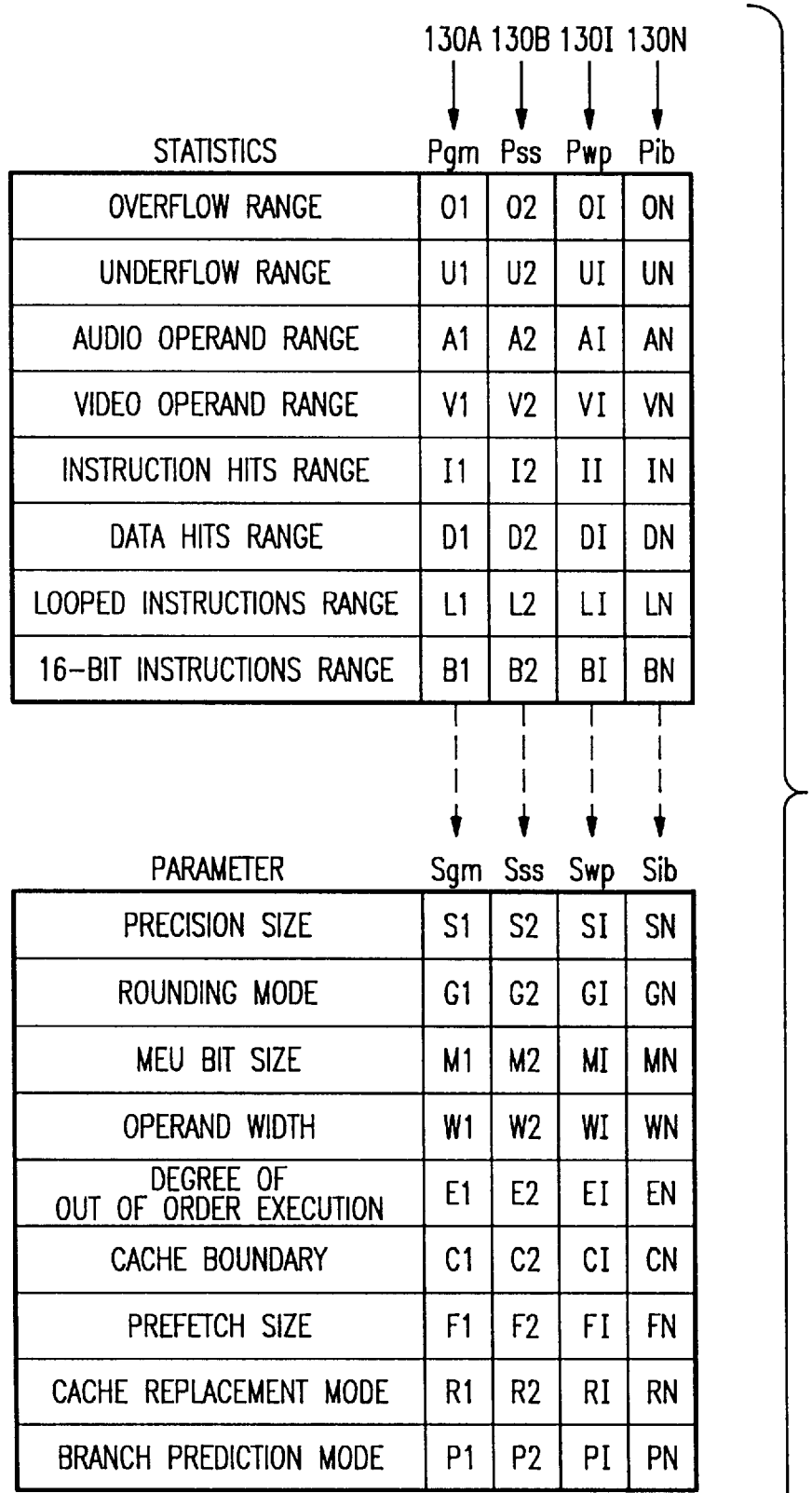
FIG. 4 illustrates four statistical patterns Pgn, Pss, Pib and Pwp each of which triggers a corresponding one of parameter sets Sgm, Sss, Sib and Swp respectively, thereby to put a fine tunable CPU of into one of the states of FIG. 3.

In addition to the above-described parts, computer system 100A also includes a system management memory 130 that is coupled via CPU bus 112 to tunable CPU, and that is accessible to CPU-circuitry tuner 110T. System management memory 130 contains a number of parameter sets, e.g. set 130A, . . . 130I, . . . 130N, where N is the number of parameter sets. Parameter sets for one embodiment are described below in reference to FIG. 4. Note that system management memory 130 can be "hidden" i.e. made inaccessible to tunable CPU 110A while executing one of applications 120A–120M in the manner described in, for example, "The CPU and Undocumented Instructions," Chapter 3 "The Undocumented PC" by Frank Van Gilluwe, Addison-Wesley Publishing Company, Reading, Mass., that is incorporated by reference herein in its entirety.

Figure 1B:
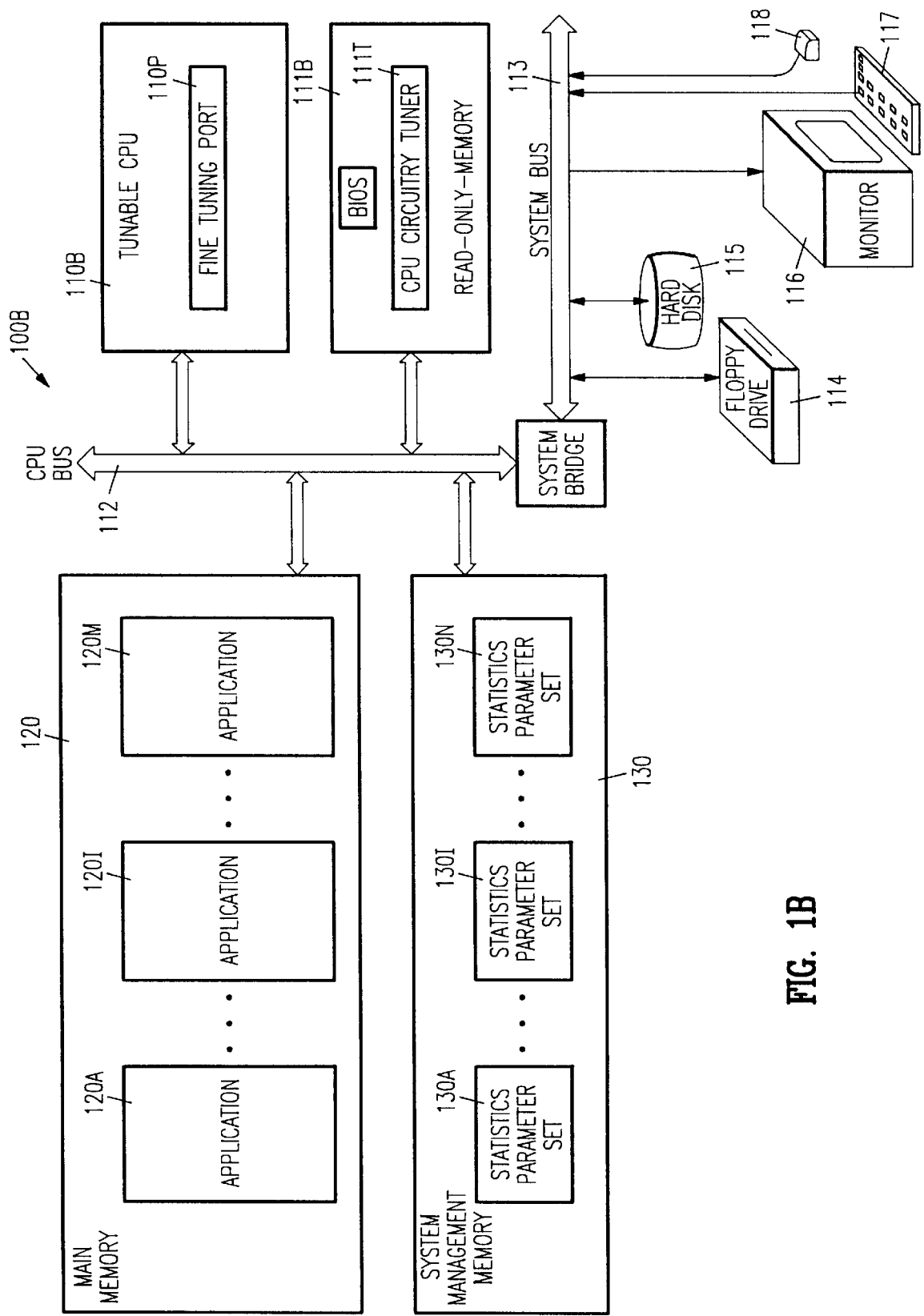
Figure 1C:
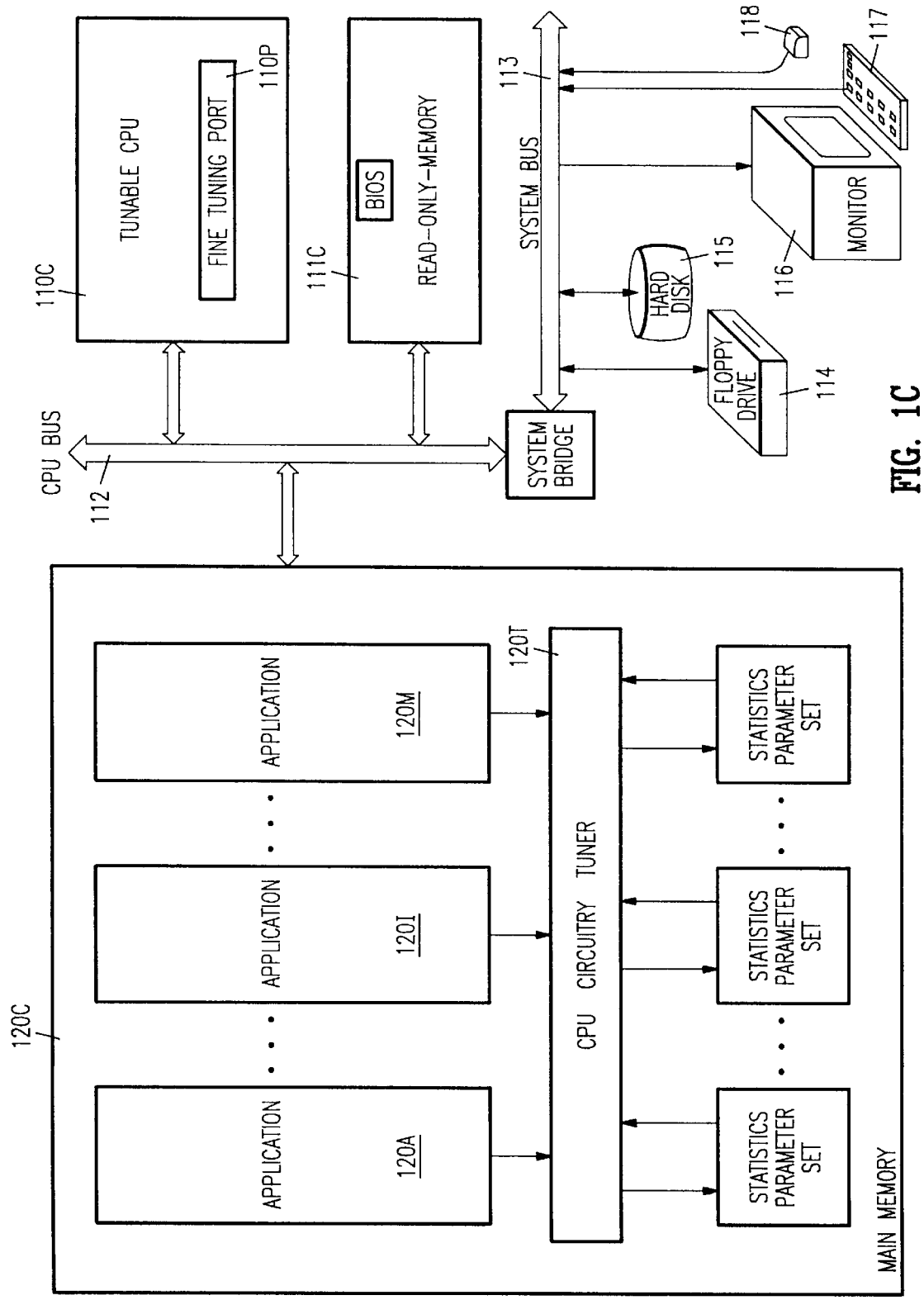
Figure 2:
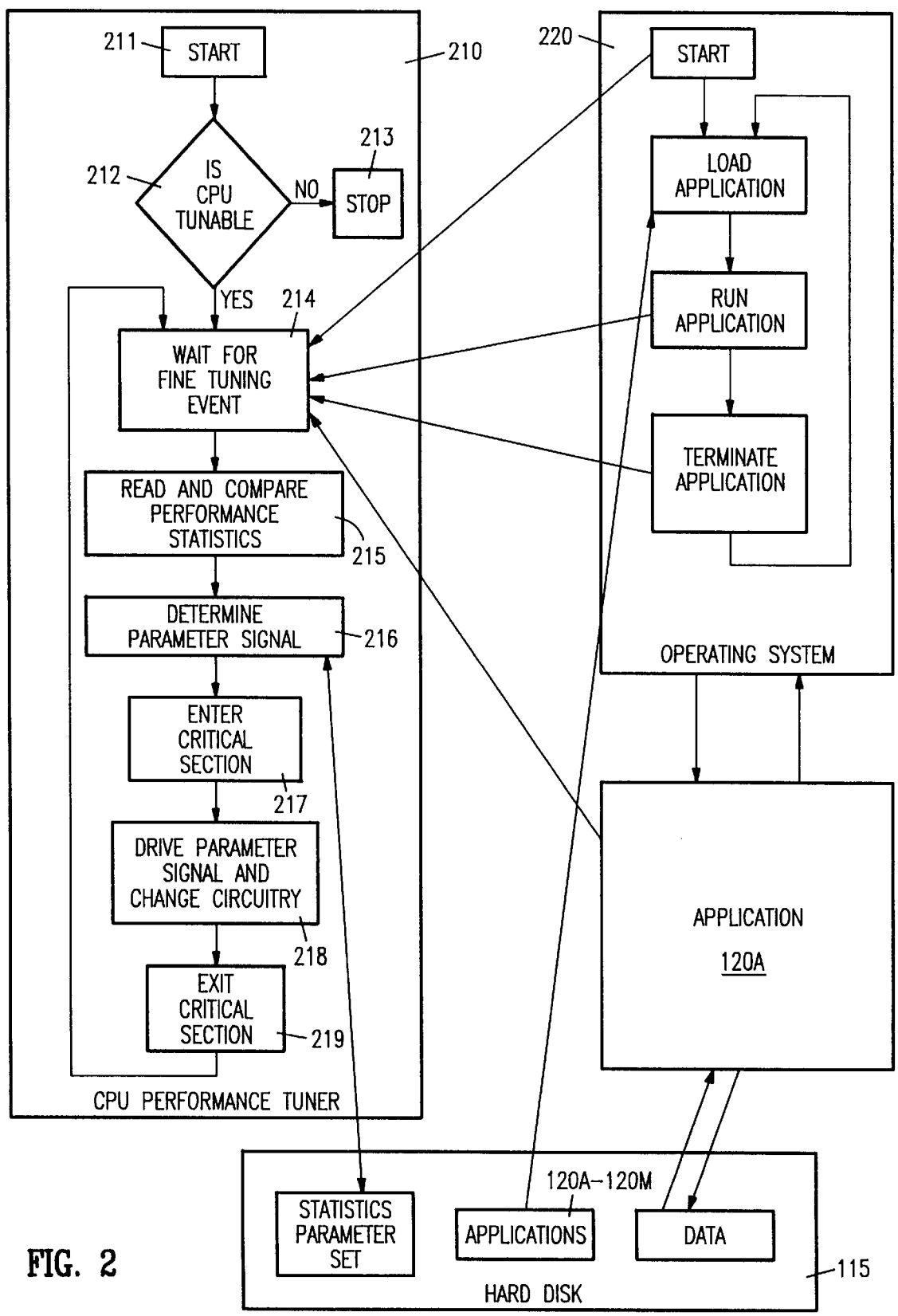
FIG. 2 illustrates, in a high level flowcharts and block diagrams, various steps performed by the CPU-circuitry tuner of FIGS. 1A, 1B and 1C.

CPU-circuitry tuner 110T in tunable CPU 110A can be implemented in hardware as circuitry that performs a number of steps illustrated in FIG. 2 (described below), or alternatively can be encoded as microcode resident in storage elements of tunable CPU 110A. In another embodiment, a tunable CPU 110B (FIG. 1B) does not have the above-described CPU-circuitry tuner 110T, but rather has a CPU-circuitry tuner 111T in software that is encoded in read only memory 111 in addition to the BIOS instructions. CPU-circuitry tuner 111T also performs the steps described below in reference to FIG. 2. Note that the same reference numerals are used for various parts in FIG. 13 that are similar or identical to corresponding parts in FIG. 1A.

In yet another embodiment of the invention, both tunable CPU 110C and read only memory 111C do not have a CPU-circuitry tuner. Instead, a CPU-circuitry tuner 120T is resident in main memory 120C. In addition, computer system 100C does not have a system management memory 130, and rather the parameter sets 130A–130N are encoded in system management memory 130. In this embodiment as well, CPU-circuitry tuner 120T performs the steps described in reference to FIG. 2.

A CPU-circuitry tuner 210 in one embodiment of the invention initializes variables on start up in a step 211 and thereafter checks in step 212 whether the central processing unit, e.g. CPU 110A (FIG. 1A) is tunable, and if not stops in step 213.

If the CPU is tunable, CPU-circuitry tuner 210 may load, for example, parameter s et s 130A–130N into memory, and may cause tunable CPU 110A to use one of parameter sets 130A–130M as a default set. Then CPU-circuitry tuner 210 goes from step 212 to step 213 and waits for an event indicating the need for fine tuning. The event can be, for example, the running of an application program by the operating system, termination of an application program by the operating system, or a system interrupt that occurs periodically, e.g. every five seconds or 10 seconds during the running of an application. On occurrence of such an event, CPU-circuitry tuner 210 goes to step 215 and analyzes (as described more completely below) the performance statistics from fine tuning port 110P.

Next, CPU-circuitry tuner 210 enters a critical section in step 216, for example by disabling interrupts and serializing the execution of instructions in CPU 110A (so that instructions are executed in sequential order). During this step, if necessary, CPU-circuitry tuner 210 also switches from main memory 120 to system management memory 130 that can be made inaccessible to applications 120A-120M as described above.

After entering the critical section, CPU-circuitry tuner 210 goes to step 218 and drives a multi-valued parameter signal (as described in the above-incorporated applications, Ser. No. 08/710,336 and 08/710,337 to fine tuning port 110P. Then CPU-circuitry tuner 210 changes operation of the circuitry in one or more tunable units of CPU 110A for example by driving the parameter signal to the tunable unit. Step 218 can be implemented by use of model specific registers of the type described in the above incorporated book, "The Undocumented PC" by Frank Van Gilluwe (in particular, see Chapter 3, pages 31–91).

Thereafter, CPU-circuitry tuner 210 goes to step 219 and exits from the critical section, for example by enabling interrupts, so that out of order execution occurs immediately following the change in operation of circuitry in step 218 based on, for example, the signal DEGREE OF OUT OF ORDER EXECUTION, of the type described in the above-referenced applications Ser. Nos. 08/710,336 and 08/710,337.

In the step 219, CPU-circuitry tuner also switches from system management memory 130 to main memory 120 as necessary, and also flushes a cache memory (not shown) if necessary. Thereafter, CPU-circuitry tuner 210 returns to step 214 and awaits another fine tuning event.

Figure 3:
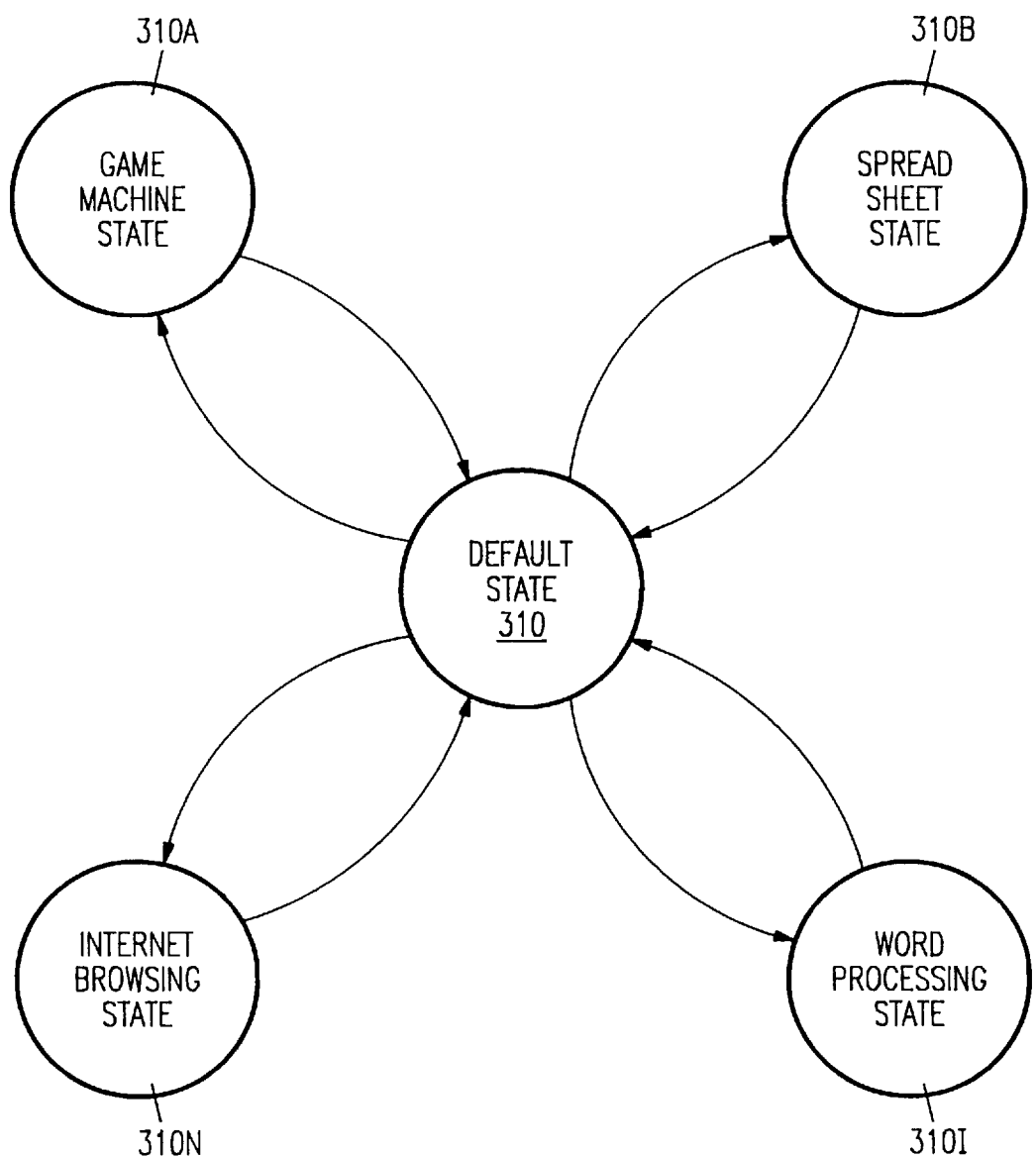
FIG. 3 illustrates, in a state machine, the various states of a fine tunable CPU illustrated in FIGS. 1A, 1B and 1C.

As noted above, on startup, CPU-circuitry tuner 210 can cause tunable CPU 110A to use one of parameter sets 130A–130M as a default set in default state 310. Thereafter, on occurrence of a match during a fine tuning event, CPU-circuitry tuner 210 causes tunable CPU 110A to transfer from state 310 to one of states 310A–310N (FIG. 3). Specifically, as noted above, CPU-circuitry tuner 210 compares the read statistics to each one of the statistics patterns Pgm, Pss, Pib and Pwp (in sets 130A–130N) and selects depending on a match, one of parameter sets Sgm, Sss, Sib and Swp corresponding to the matched statistics pattern.

For example, if statistics read from fine tuning port 110P match ranges O1, U1, A1, B1, I1, D1, L1 and B1 of pattern Pgm, then, the parameter set Sgm is selected, i.e. signals S1, G1, M1, W1, E1, C1, F1, R1 and P1 are driven in step 218 to fine tuning port 110P, thereby to change operation of the circuitry in tunable CPU 110C. In this example, each range, e.g. range O1 is formed of two parts, a minimum limit O1min and a maximum limit O1max. An overflow statistic Os that is read from fine tuning port 110P matches a range O1 if O1min<Os<O1max. Also, each of parameter signals SI, GI, MI, WI, EI, CI, FI, RI and PI is multi-valued, i.e. has one of a number (e.g. 1024) of values within the respective predetermined ranges (Smax, Smin), (Gmax, Gmin), (Mmax, Mmin), (Wmax, Wmin), (Emax, Emin, (Cmax, Cmin), (Fmax, Fmin), (Rmax, Rmin) and (Pmax, Pmin). That is, if Cmax is 512 KBytes and Cmin is 128 Kbytes, cache boundary signal CI can be any value in the predetermined cache boundary range of (128, 512), e.g., 256 KBytes. Such a degree of fine tuning is not possible when a cache is merely disabled and enabled, for example, by use of a single-valued signal (e.g. an ON/OFF signal).

In this example, ranges O2 and U2 for overflows and underflows can be predetermined to be fairly small, e.g. O2min set to 0, O2max set to 1, U2min set to 0 and U2max set to 1, thereby to fine tune the configuration of tunable CPU 110A for operation in, for example, spread sheet state 310B.

Although certain specific embodiments have been described herein, numerous modifications and adaptations of the described embodiments will be obvious in view of the disclosure. For example, instead of using predetermined parameter sets 130A–130N, a CPU-circuitry tuner can start with a default parameter set, e.g. set 130A and thereafter dynamically change each parameter signal independent of the other parameter signals, or change a group of parameter signals smaller than the set of parameter signals.

As another example, the CPU-circuitry tuner can change a parameter signal SI depending on one or more of the statistics signals OI-UI. That is, precision size signal SI is unaffected by the changes in the other statistics, e.g. statistics AI-BI. In this manner, each of the parameter signals SI, GI, MI, WI, EI, CI, FI, RI and PI can be changed dynamically without reference to any of the predetermined parameter sets 130A–130N.

Although in one embodiment, the computer process transitions between predetermined states, in other embodiments, the computer process can go to any state that is not predetermined, i.e. dynamically determined based on the statistics. For example, the computer process can "learn" by receiving feedback on statistics generated by changing a parameter, and literally keep changing parameters until certain predetermined optimal statistics are obtained.

The degree of such tunability requires a trade-off between the number of transistors needed to implement such logic and the benefit obtained from such fine tuning. Although in one specific embodiment, the computer process is implemented by a set of comparators and registers well known to a person of skill in the art in view of the enclosed disclosure.

Numerous such modifications and adaptations of the above described embodiments are encompassed by the attached claims.

We claim:

1. A computer process for fine tuning a central processing unit (CPU) having a number of tunable units, the computer process comprising the steps of:

waiting for an event indicating a need for fine tuning;

reading a statistic of performance of the CPU;

comparing the read statistic with a predetermined statistic;

determining a multi-valued parameter signal depending on the comparison;

driving the determined parameter signal to one of the tunable units; and changing operation of circuitry in the tunable unit depending on the determined parameter signal.

2. The computer process of claim 1 further comprising:

checking whether the CPU has a tunable unit prior to the step of driving.

3. The computer process of claim 1 wherein the tunable unit's circuitry comprises a plurality of predetermined structures and the CPU uses a first predetermined structure from the plurality prior to the step of driving, the step of changing comprising:

switching the CPU's use to a second predetermined structure in the plurality in lieu of the first predetermined structure on receipt of the parameter signal.

4. The computer process of claim 1 wherein the parameter signal is a cache boundary signal and the step of changing comprises using a cache of a second size different from a first size used prior to the step of changing, said first size and said second size being values in a predetermined cache boundary range.

5. The computer process of claim 1 further comprising the step of entering a critical section prior to the step of driving.

6. The computer process of claim 5 wherein the step of entering comprises disabling interrupts.

7. The computer process of claim 6 wherein each of said steps comprises executing instructions, said instructions being executable in parallel order and in sequential order and the step of entering comprises serializing execution such that instructions are executed in sequential order.

8. The computer process of claim 1 wherein the event occurs periodically.

9. The computer process of claim 1 wherein the event comprises start of execution of an application program.

10. The computer process of claim 1 wherein the step of entering further comprises switching to a memory inaccessible during execution of the application program.

* * * * *